United States Patent [19]
Yoshimatsu et al.

[11] Patent Number: 5,405,716
[45] Date of Patent: Apr. 11, 1995

[54] BATTERY CASE AND TERMINAL COVER

[75] Inventors: Morio Yoshimatsu, Kanagawa; Hiroaki Itoh, Chiba, both of Japan

[73] Assignee: Sony Corporation, Japan

[21] Appl. No.: 32,239

[22] Filed: Mar. 17, 1993

[51] Int. Cl.6 .............................................. H01M 2/00
[52] U.S. Cl. ...................................... 429/65; 429/163; 429/123
[58] Field of Search .................. 429/65, 175, 163, 123, 429/176

[56] References Cited

U.S. PATENT DOCUMENTS

| | | | |
|---|---|---|---|
| 3,884,725 | 5/1975 | Schmidt | 429/65 |
| 4,582,767 | 4/1986 | Morioka et al. | 429/163 X |
| 4,699,855 | 10/1987 | Abraham et al. | 429/175 |
| 4,770,958 | 9/1988 | Newman et al. | 429/72 X |
| 4,894,295 | 1/1990 | Cheiky | 429/27 |

Primary Examiner—Anthony Skapars
Attorney, Agent, or Firm—Ronald P. Kananen

[57] ABSTRACT

A battery case and terminal cover includes a cap-like cover plate which fits over a surface of a battery case which mounts terminal portions of the battery. The cover plate has a border portion which contacts sides of the battery case. The border portions have projections formed thereon which are reciprocated by indentations on the sides of the battery case so than when the cover plate is fitted over the surface of the battery case, the projections and indentations engage each other for removably affixing the cover plate to the battery case.

1 Claim, 5 Drawing Sheets

BATTERY CASE AND TERMINAL COVER

BACKGROUND OF THE INVENTION

1. Field of The Invention

The present invention relates generally to a cover for a battery. Specifically, the present invention relates to a compact battery cover which covers and protects terminal portions of a battery or battery pack.

2. Description of The Prior Art

With the widespread use of portable battery-operated electronic equipment, the use of batteries and battery packs has expanded enormously. With the use of certain types of equipment utilizing for example, rechargeable battery packs, is is often common practice to carry a plurality of these battery packs when using such portable electronic components outdoors, or on location.

FIG. 7 shows a conventional cover for a battery or battery pack. As may be seen in the drawing, such a conventional battery cover comprises a plastic case 201 having a lid 202 therefor, a battery case 101 is inserted into the plastic case when not in use for protecting terminal portions 105, 106 formed in depressions 103, 104 of a mounting surface 102 of the battery case 101.

According to this type of battery cover, the battery case may be appropriately stored and terminal portions thereof protected, however, the above-described conventional battery cover is bulky and larger than necessary and requires a lid in addition to the cover portion, making it costly to manufacture in terms of materials and parts. Also, the battery cover 201 closely surrounds the battery ease 101 in a substantially airtight fashion, it becomes difficult to easily remove the battery from the case.

Thus, it has been required to provide a compact simple cover for battery terminals which is inexpensive to manufacture and conservative of materials and which may easily be engaged with and disengaged from a battery.

SUMMARY OF THE INVENTION

It is therefore a principal object of the present invention to overcome the drawbacks of the prior art.

It is a further object of the present invention to provide a compact low-cost battery terminal cover.

In order to accomplish the aforementioned and other objects, a battery case and terminal cover is provided, comprising: a cover plate of a shape and size equivalent to a surface of the battery case housing terminal portions of a battery, the cover plate having edge portions projecting from peripheral edges thereof so as to surround side portions of the battery case proximate the surface of the battery case when the cover plate is contacted with the surface of the battery case and having first engaging portions formed on an inner surface of the edge portions of the cover plate; and second engaging means formed on the side portions of the battery case for engaging with the first engaging portions so as to removably secure the cover plate to the surface of the battery case.

DESCRIPTION OF THE PREFERRED EMBODIMENT

Figure 1:
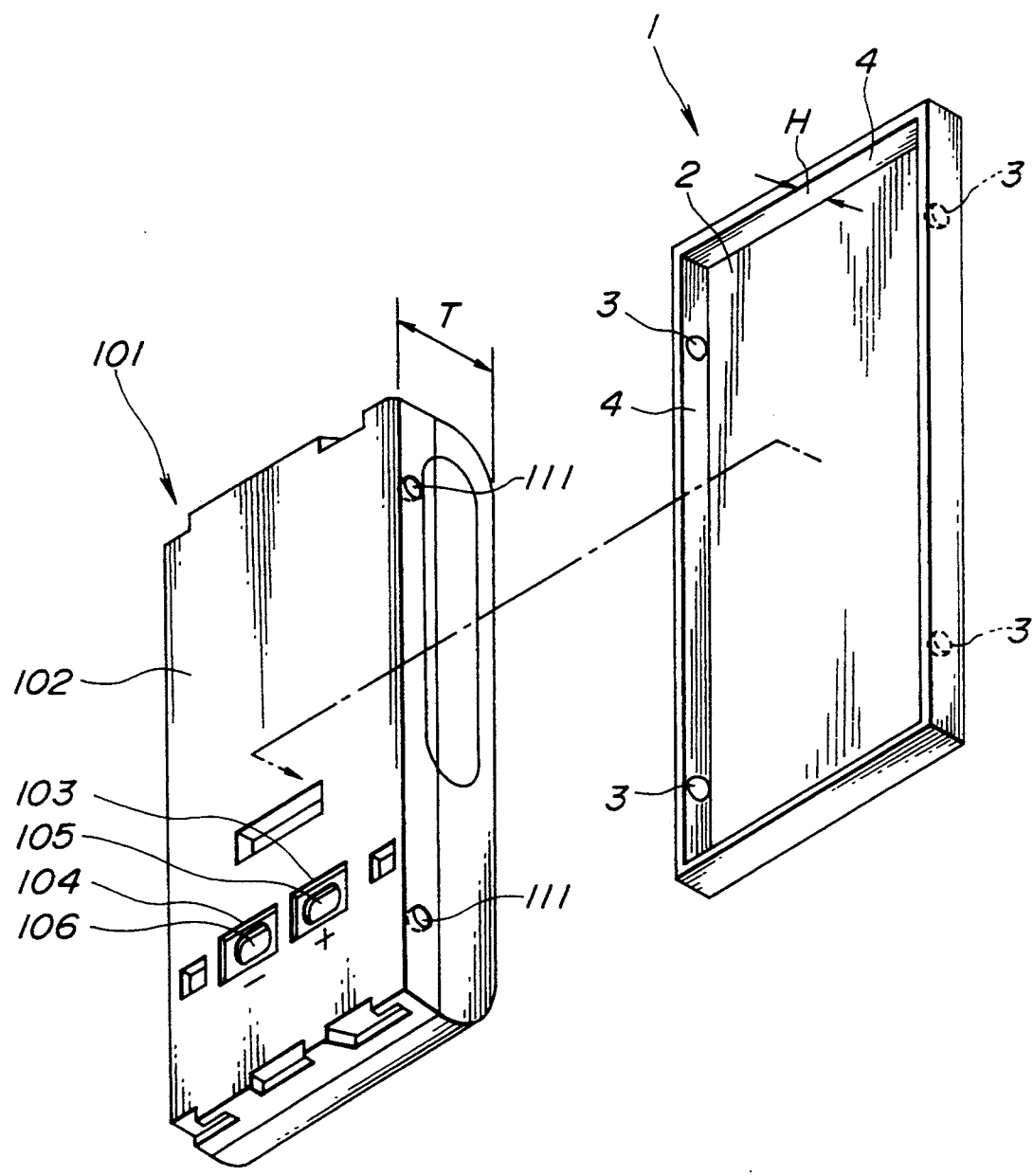
FIG. 1 shows a perspective view of a battery case and terminal cover therefor according to a first embodiment of the invention, in a separated state.

Referring now to the drawings, particularly to FIG. 1, a first embodiment of a battery case and terminal cover according to the invention will be described in detail.

The battery case of the present invention is substantially identical to that described in reference to the prior art. That is, terminal portions 105, 106 are formed in depressions 103, 104 of a mounting surface 102 of a battery case 101.

As may be seen frown the drawing, the terminal cover according to the invention comprises a cap-like cover 1 which may be attached to the battery case 101 in snap-on fashion. The cover 1 comprises a cover plate 2 which lies over the terminal mounting surface 102 of the battery case 101. A raised border portion 4 is formed around the peripheral edges of the cover plate 2 such that the border portion contacts sides and top portions of the battery case 101 when the cover 1 is fitted onto the terminal mounting surface 102 of the battery case 101.

As may be seen in FIG. 1, an inner side of the border portion 4 has projections 3 formed thereon, the projection corresponding in size, shape and position with indentations 11 formed on sides of the battery case 101.

Figure 2:
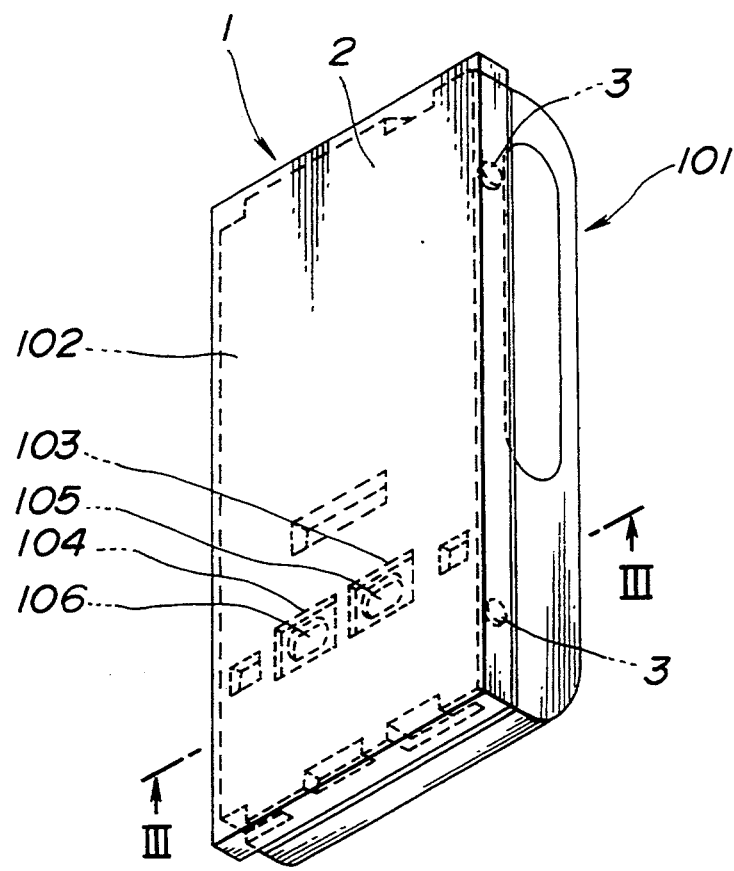
FIG. 2 is a perspective view of the battery case and cover of FIG. 1 in an engaged state.
Figure 3:
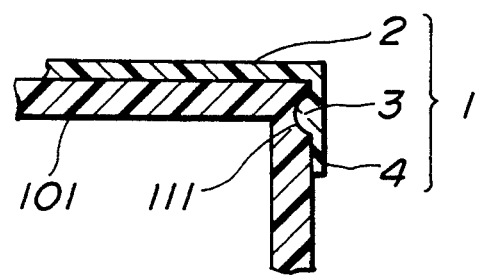
FIG. 3 is an enlarged cross-sectional view of the terminal cover of the first embodiment taken along line III—III of FIG. 2, showing the means of engagement with the battery case.

Referring now to FIGS. 2 and 3, when the cover 1 is pushed onto the terminal mounting surface 102 of the battery case 101, the projections 3 are aligned with the indentations 111 and are inserted thereinto to hold the cover 1 securely onto the terminal mounting surface 102 of the battery case 101.

The cover plate 2 of the cover 1 is made of a flexible material such as vinyl chloride or polyethylene which has insulating characteristics. The terminal mounting surface 102 of the battery case 101 is of substantially the same size and shape as the cover plate 2, which may be rectangular, for example, and the thickness T of the battery case is determined at between $\frac{1}{4}$-$\frac{1}{2}$ of a height H of the border portions 4 of the cover 1.

Thus, when the cover 1 is slipped over the terminal mounting surface 102 of the battery case 101 the cover plate 2 insulatingly protects the terminal 105, 106 of the battery (not shown) within the battery case 1. Further, corners of the border portion 4 snugly fit over the corners of the terminal mounting surface 102 and the battery case 101 while the projections 3 engage the indentations 111 to securely attach the cover 1 to the battery case 101 such that the cover may be easily removed when the battery is to be used.

Figure 4:
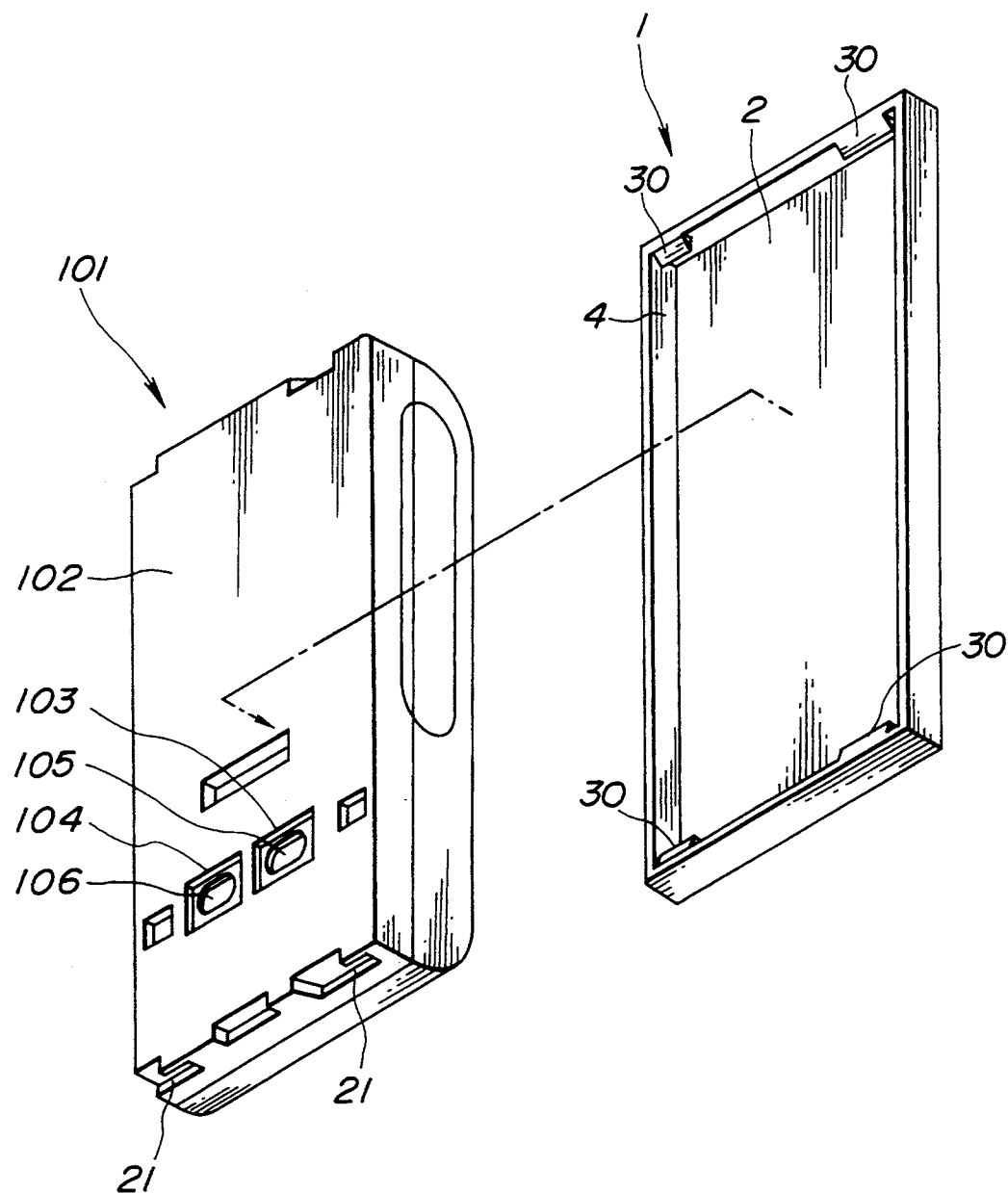
FIG. 4 shows a perspective view of a barrel case and terminal cover therefor according to a second embodiment of the invention, in a separated state.

Referring now to FIG. 4, a second embodiment of a battery terminal cover according to the present invention will be explained in detail.

According to the present embodiment, the battery case 101 need not be provided with indentations 111 on side portions thereof. Instead, projections 30 of the present embodiment are formed at lower inner sides of the border portion 4 such that they may engage slots 21 provided on the battery case 101 for allowing the battery case to be attached to a particular electronic component with which it is intended to be used. Thus, the same slots 21 are utilized for attachment of the battery case when in use and for attachment of the cover 1 when the battery is not in use. In other respects the construction of the battery case 101 and the cover 1 are identical with the above-described first embodiment.

Figure 5:
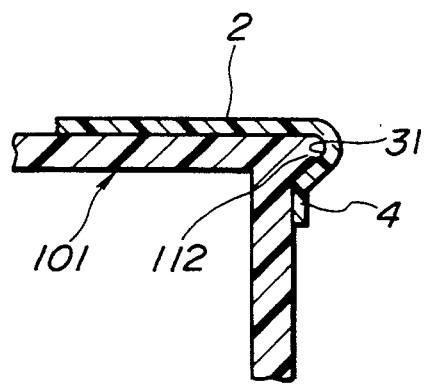
FIG. 5 is an enlarged cross-sectional view of the terminal cover of the second embodiment showing the means of engagement with the battery case.
Figure 6:
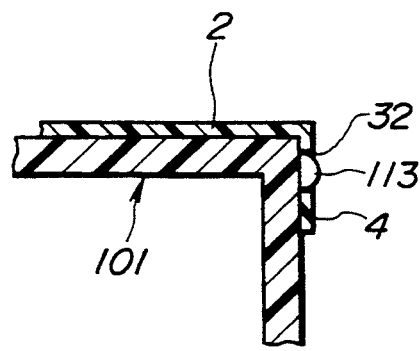
FIG. 6 is an enlarged cross-sectional view of an alternative construction of the means of engagement between the terminal cover and the battery case.
Figure 7:
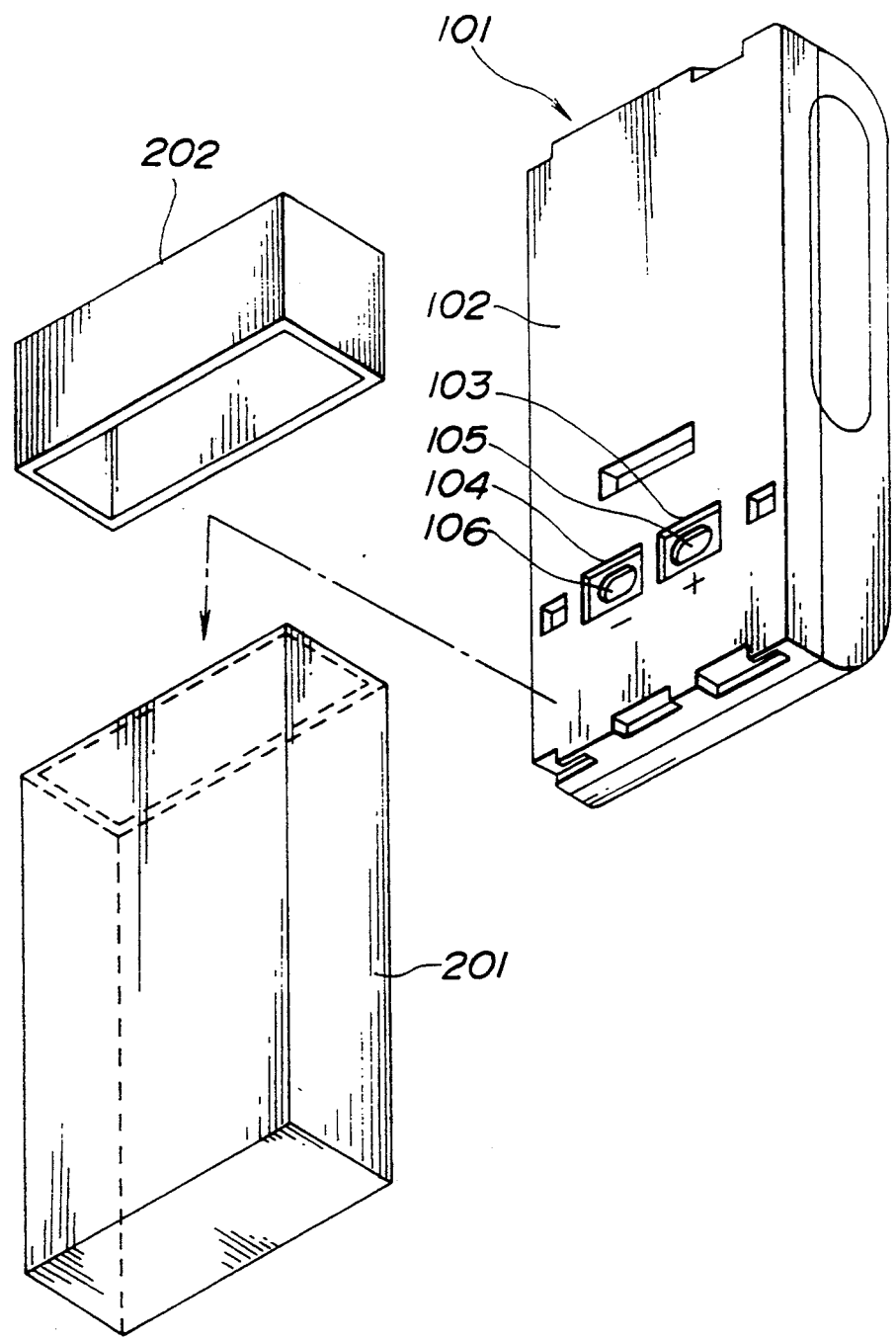
FIG. 7 is a perspective view of a conventional battery cover.

Further, referring to FIGS. 5 and 6, alternative constructions of the above-described embodiments are possible for facilitating attachment of the cover 1 to the battery case 101.

FIG. 5 shows a construction in which projections 112 are formed at extreme corner portions of the battery case 101 and the border portion 4 of the cover 1 is formed with indentations 31 at locations corresponding to the projections 111.

FIG. 6 shows an alternative arrangement in which side portions of the battery case 101 are provided with hemispherical projections 113 while the border portions 4 of the cover 1 are provided with corresponding openings 32 which fit over the projections 111 when the cover 1 is fitted onto the battery case 101.

It will be noted that a battery terminal cover according to the invention may offer secure and inexpensive protection to a battery utilizing any of the above-described means of attachment.

Thus, all the objects of the invention are fulfilled while manufacturing costs and complexity are reduced.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A battery case which is adapted to be operatively disposed on an electrical device and terminal cover for said battery case, wherein said battery case comprises:

a first flat surface which is adapted to be set against a corresponding flat surface of a device that is adapted to be powered by a battery enclosed in said battery case, said first flat surface including recess means via which an electrical connection can be established between the battery included in said battery case and the electrical device;

first and second opposed narrow side edges and which are contiguous with said flat surface;

first and second opposed narrow end edges which are contiguous with said flat surface;

first and second essentially L-shaped connection recesses formed in said first end edge which receive first and second projection means which project from the device; and third and fourth essentially L-shaped connection recesses formed in said second end edge which receive third and fourth projection means which project from the device; and wherein said terminal cover comprises:

a second flat surface which is adapted to be set against said first flat surface when said battery is not disposed on the device and when said cover is disposed on said battery case;

third and fourth side edges which are contiguous with said second flat surface and which respectively enclose part of said first and second side edges;

third and fourth end edges which are contiguous with said second flat surface and which respectively enclose part of said first and second end edges;

first and second projection means formed on said third end edge for engaging in said first and second connection recesses; and third and fourth projection means formed on said fourth end edge for engaging in said third and fourth connection recesses.

* * * * *